United States Patent [19]

Suzuki et al.

[11] Patent Number: 5,308,704
[45] Date of Patent: May 3, 1994

[54] CELL ADHESIVE MATERIAL AND METHOD FOR PRODUCING SAME

[75] Inventors: Yoshiaki Suzuki, Tokyo; Masahiro Kusakabe, Kanagawa; Jae-Suk Lee, Hirosawa Wako; Makoto Kaibara, Hirosawa Wako; Masaya Iwaki, Hirosawa Wako; Hiroyuki Sasabe, Hirosawa Wako, all of Japan

[73] Assignees: Sony Corporation, Tokyo; Rikagaku Kenkyusyo, Saitama, both of Japan

[21] Appl. No.: 933,358

[22] Filed: Aug. 19, 1992

[30] Foreign Application Priority Data

Aug. 20, 1991 [JP] Japan ................... 3-259550

[51] Int. Cl.⁵ .......................... B32B 17/00
[52] U.S. Cl. .................. 428/410; 428/423.1; 428/500; 427/525; 427/533; 427/536
[58] Field of Search ........ 428/410, 423.1, 500; 264/22; 427/525, 533, 536

[56] References Cited

U.S. PATENT DOCUMENTS

| | | | |
|---|---|---|---|
| 4,743,493 | 5/1988 | Sioshansi et al. | 427/525 |
| 4,927,676 | 5/1990 | Williams et al. | 428/423.1 |
| 4,957,602 | 9/1990 | Binder et al. | 427/525 |
| 5,130,161 | 7/1992 | Mansur et al. | 427/525 |
| 5,132,108 | 7/1992 | Narayanan et al. | 427/536 |
| 5,152,783 | 10/1992 | Suzuki et al. | 623/1 |

FOREIGN PATENT DOCUMENTS 3-112560  9/1989  Japan.
3-068754  3/1991  Japan .................... 427/525

OTHER PUBLICATIONS

Y. Suzuki, et al., "Effects of Ion Implantation on Protein Adsorption Onto Silicone Rubber," Mat. Res. Soc. Symp. Proc., vol. 110, 1989 Materials Research Society, pp. 669–679.

Primary Examiner—Paul R. Michl
Assistant Examiner—La Vonda Dewitt
Attorney, Agent, or Firm—Limbach & Limbach

[57] ABSTRACT

A cell adhesive material with excellent cell adhesion and cell proliferating property and a method for producing the same are provided. The adhesion and proliferation of cells can be improved remarkably by the surface modification of a cell adhesive material comprising a polymer material containing carbon as a constituting element, such as polystyrene or segmented polyurethane, wherein at least a part of the surface is modified by ion bombardment through ion implantation. The method for producing such cell adhesive material comprises implanting ions into at least a part of the surface of the polymer material. The cell adhesive material and the method for producing the same are promising for application to cell culture petri dishes and hybrid-type medicinal materials.

10 Claims, 9 Drawing Sheets

7mm

7mm

CELL ADHESIVE MATERIAL AND METHOD FOR PRODUCING SAME

BACKGROUND OF THE INVENTION

The present invention relates to a cell adhesive material applicable to cell culture containers or various medicinal materials and also relates to a method for producing the same. More specifically, the present invention relates particularly to a material with improved cell adhesion and a method for improving the adhesion.

For organs such as skin, mucosa, blood vessel, liver, and spleen which functions cannot be replaced satisfactorily with artificial materials alone, the trend to develop hybrid artificial organs of integrated cell type have been more popular in recent years. In such case, an important issue resides in the selection and designing of a matrix material on which culturing cells spread. For example, it is well known that the adhesion, growth and proliferation of endothelial cells depends on the state of fixing the cells. Matrices are generally constituted of polymer materials, and such polymer materials have conventionally been surface modified by a variety of processes.

Surface modification processes are schematically grouped in dry process representatively illustrated by plasma process, arc process, etc. and wet process represented by coating, graft polymerization, etc.

The plasma process includes, for example, non-reactive plasma process based on the sputtering action of inactive ions such as argon, etc., reactive plasma process using reactive gases such as oxygen, water vapor, etc. In any of these processes, the incident energy of ions is approximately several keV, which can modify cell adhesion or the contact angle of cells to water by rendering the surface of a polymer material in a rough surface or can give hydrophilicity via the introduction of polarized structures such as $>C=O$ group, $C-O-$ bond, and the like.

The coating is conducted by precoating an adhesive protein in solution from connective tissues such as collagen, fibronectin, etc. onto a matrix surface, thereby improving the adhesion of endothelial cells, fibroblasts, etc.

However, such conventional techniques still have some problems to be solved.

Firstly, the surface of polymer materials gets rough once the plasma process is effected, so the resulting surface is likely to suppress cell proliferation although it generally propagates cell adhesion. The plasma status varies depending on the apparatus, so uniform conditions for such process are substantially impossible to realize, resulting in no chance of improving controllability and reproducibility.

Alternatively, the coating has a problem in that the adhesive strength between a matrix and a cell is relatively weak because cells bond through the layer of an adhesive protein to the matrix.

OBJECT AND SUMMARY OF THE INVENTION

It is the object of the present invention to provide a cell adhesive material with excellent cell adhesion and cell proliferating property, and a method for producing the same with excellent controllability and reproducibility.

The present inventors have made various investigations in order to achieve the above object. They have found that the adhesion and proliferation of cells can be improved remarkably by the surface modification of cell adhesive materials via ion bombardment and that ion implantation in a certain preset fluence range is effective so as to effect such modification. The surface modification of polymer materials via ion implantation is disclosed in Mat. Res. Soc. Symp., 110, 669 (1989) or Japanese Patent Laid-open No. 3-112560, such that an antithrombotic material is prepared by implanting ions such as $H^+$, $O_2^+$, $N_2^+$, etc. into silicone resin. According to the present invention, such ion implantation technique is applied to the surface modification of cell adhesive materials.

The cell adhesive material according to a first aspect of the present invention comprises a polymer material containing carbon as a constituting element, wherein at least a part of the surface is modified by ion bombardment.

The method for producing a cell adhesive material according to a second aspect of the present range of $1\times10^{15} \leq \phi < 1\times10^{18}$ ions/cm² into at least a part of the surface of a polymer material containing carbon as a constituting element.

DESCRIPTION OF PREFERRED EMBODIMENTS

Figure 1:
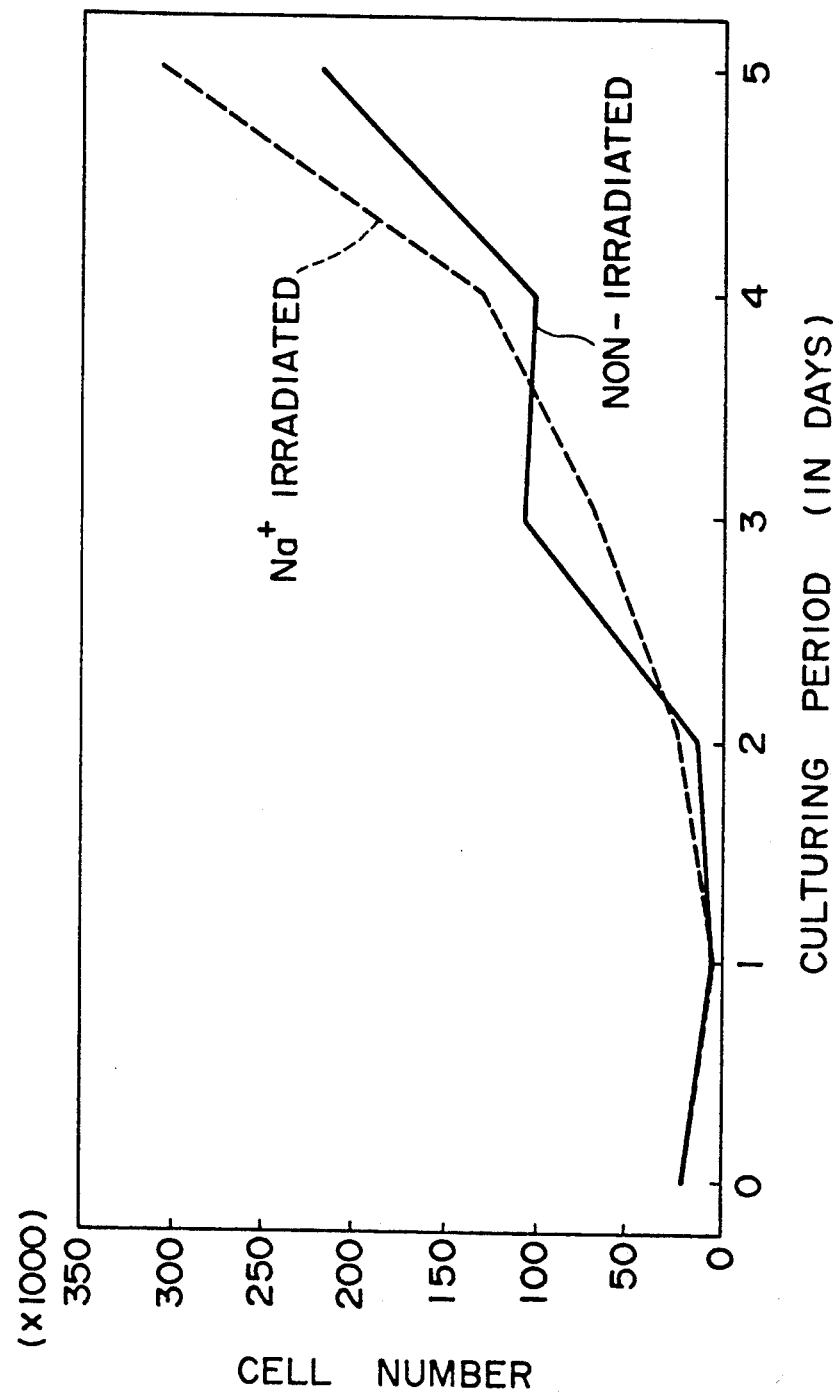
FIG. 1 is a graph depicting the time course of the change in the cell number of bovine vascular endothelial cells cultured on an $Na^+$ irradiated PS petri dish, compared with the cell number on a non-irradiated PS petri dish.

The polymer material containing carbon as the constituting element may be a so-called organic polymer material, having a primary chain of carbons such as polystyrene, polyurethane, etc., or a silicon resin having a primary chain of siloxane (Si—O—bond) together with a side chain of hydrocarbon groups, etc.

The ion species to be implanted is illustrated by He+, C+, N+, Ne+, Na+, N$_2$+, O$_2$+, Kr+, and the like, but is not limited to them. Any ion may be used as long as its solubilization does not suppresses cell growth.

The fluence $\phi$ is selected in a range of $1\times10^{15} \leq \phi < 1\times10^{18}$ ions/cm$^2$ At the order of $1\times10^{14}$ ions/cm$^2$, no distinctive effect can be observed on improving cell adhesion, while at the order of $1\times10^{18}$ ions/cm$^2$, the effect on improving cell adhesion is saturated although the period required for such treatment is elongated much longer.

For ion accelerating energy, it is considered that the degree thereof may induce the difference in energy transmission mechanism. Practically, the energy is satisfactorily set in a range of about several tens to several hundreds keV.

The beam current density is preset in a range not above 0.5 $\mu$A/cm$^2$. This is because an extraordinarily high beam current density raises abnormally the temperature of a polymer material as a target, leading to the deterioration of the polymer material of itself and a possible reduction of cell adhesion.

It is not clearly shown the relation between the structure of a polymer material and the cell adhesion thereof. However, it is deduced that the introduction of various functional groups generated by ion bombardment as well as the change in surface charge density through the introduction may have a significant role for improving the cell adhesion of the cell adhesive material according to the first aspect of the present invention. For the carbon structure, a similar amorphous structure is observed even if a different polymer material is employed.

In accordance with the second aspect of the present invention, ion implantation is proposed as a means for providing the ion bombardment described above. Ion implantation of itself is limited to the interaction between ion beam and an implanting material (target material). According to the reaction, furthermore, ions can be implanted at an optional depth from the surface by selecting the incident energy of ions. Such reaction is thus under excellent control, which is a unique characteristic feature that cannot be observed in plasma process. For the implanted ions, a certain difference in mechanism is observed between an ion with a relatively small mass and an ion with a relatively large mass, such that electron stopping power functions on the ion with a relatively small mass at the initial discharge while nucleus stopping power initially functions on the ion with a relatively large mass. However, the implanted ions put a polymer material in a heated state due to lattice vibration (thermal non-equilibrium state), resulting in melting, amorphous preparation, and the like.

The present invention will now be described with reference to specific experimental results hereinbelow.

In the present experiments, ion implantation was conducted, through a predetermined mask pattern, into a polystyrene (PS) petri dish or a glass petri dish with the bottom surface laminated with a segmented polyurethane (SPU) film, using each ion beam of He+, N+, Ne+, Na+, or N$_2$+. Vascular endothelial cells from a bovine descending thoracic aorta were cultured in these petri dishes, to compare cell proliferation in between beam irradiated and non-irradiated parts.

Fundamental experimental conditions are firstly described.

Ion Implantation

Each ion of He+, N+, Ne+, Na+, N$_2$+, O$_2$+, and Kr+ was implanted at room temperature under the conditions of an accelerating energy of 150 keV, a fluence of $1\times10^{15}$ to $3\times10^{17}$ ions/cm$^2$ and a beam current density of 0.5 $\mu$A/cm$^2$ or less.

Specimens

The polystyrene (PS) petri dish was FALCON 1008, a product manufactured by Becton Dichinson and Company. The chemical structure of polystyrene is in the following chemical formula 1.

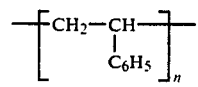

Segmented polyurethane (SPU) generally has been put into practical use as the inner coating material of artificial cardiac system. The material presently employed is supplied from Kanegafuchi Chemical Industry, Co. Ltd., which soft segment comprises polytetramethylene oxide (MW; 2,000) and a dimethyl polysiloxane compound (MW; 2,400) and which hard segment comprises diphenylmethane-4,4-diisocyanate and ethylene glycol. As shown in the following chemical formula 2, the dimethyl polysiloxane compound is prepared by bonding polyethylene oxide to both ends of the primary chain of dimethyl polysiloxane.

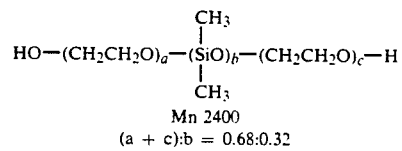

Mn 2400
(a + c):b = 0.68:0.32

Several types of SPU, having different chemical structures, can be obtained depending on the condition for film formation. So-called dry type SPU was employed, which was produced by dissolving polyurethane in a mixed solution of dioxane and N,N-dimethylacetamide (7:3), coating the resulting solution onto an appropriate substrate followed by drying into a film form.

Surface Analysis

Structural decomposition and radical formation through ion implantation were subjected to analysis by Fourier transform-infrared spectroscopy-absorptiometry of total reflection (FT-IR-ATR). A Fourier transform-infrared spectroscopy system, Type FTS-15E/D, manufactured by Biorad Digilab, U.S.A., was used.

The stretching vibration of the multiple bonds between carbons was detected by Raman spectroscopy, using a system Type Ramanor U-1000, manufactured by Jobin Yvon Co. Ltd. The scattering of argon laser (5145 Angstroms) was measured at room temperature. The system described above is of a double beam type, which can measure differential spectra.

Isolation of Vascular Endothelial Cells

According to slight modification of the method of Jaffe et al. (J. Clin. Invest., 52, 2645 (1973) and the method of Schwartz (In Vitro, 14, 966 (1978)), endothelial cells were isolated from a bovine descending thoracic aorta.

Culture Method for Vascular Endothelial Cells

Vascular endothelial cells were suspended in a culture broth (RPMI-1640, manufactured by Nissui Pharm. Co.) supplemented 10% fetal bovine serum at $2 \times 10^4$ to $2.5 \times 10^4$ cells/ml. The suspension was placed in a petri dish after ion implantation, and incubated in an incubator in an atmosphere of 5% $CO_2$ for 2 to 7 days.

After predetermined days passed, the adhesion and proliferation of the cells was visually observed with an optical microscope equipped with a phase contrast objective lens.

The results of experiments are now explained below.

EXPERIMENTAL EXAMPLE 1

In the present example, a preliminary experiment was conducted. At a fluence of $1 \times 10^{15}$ ions/cm$^2$, Na$^+$ was ion implanted through an aluminium mask into a 20-mm square pattern at the center of the bottom of a PS petri dish of a 33-mm diameter. The ion beam-irradiated part was then colored dark brown.

The suspension of vascular endothelial cells at a concentration of $2 \times 10^{14}$ cells/ml was placed in the PS petri dish, to examine the relation between the culturing period and the change in cell number. For comparison, the same experiment was done in a non-irradiated PS petri dish without ion implantation.

The results are shown in FIG. 1. In the figure, the ordinance represents the cell number and the abscissa represents the culturing period (in days); the manufactured graph in solid line corresponds to the case using the non-irradiated PS petri dish, while the graph in dotted line corresponds to the case of the Na$^+$ irradiated PS petri dish. From the results, the cell number on the Na$^+$ irradiated petri dish was far larger than the cell number on the non irradiated petri dish, which confirms the effectiveness of ion implantation.

EXPERIMENTAL EXAMPLE 2

In the present example, $N_2^+$ at a fluence of $1 \times 10^{16}$ ions/cm$^2$ was ion implanted, through an aluminium mask with four openings of a 7-mm diameter disk pattern, into the bottom of a PS petri dish. Vascular endothelial cells (simply referred to as "cells" hereinafter) were cultured on the petri dish.

Figure 2A:
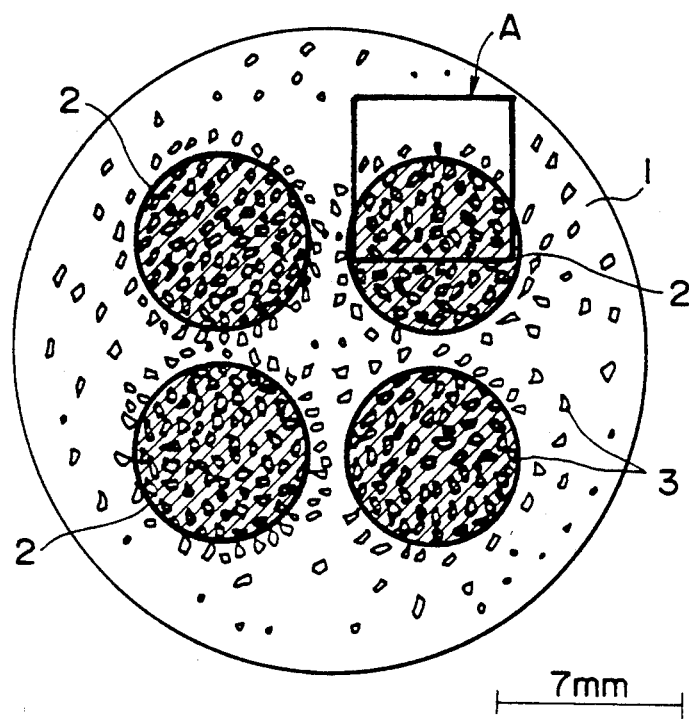
FIG. 2 is a schematic plane view depicting the cell adhesion state on a PS petri dish after $N_2^+$ irradiation on the disk patterns, on the basis of microscopic observation; (a) represents an overall view of the PS petri dish while (b) represents an enlarged view of the part thereof.
Figure 2B:
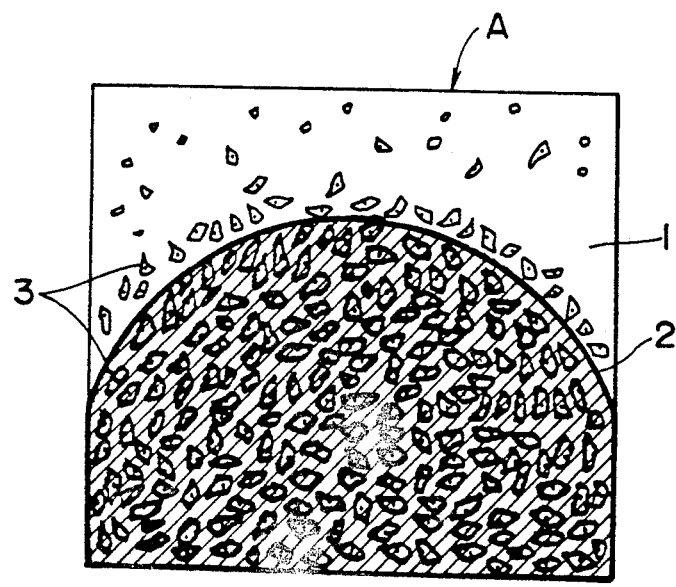

FIG. 2 illustrates a sketched view of the state 3 days later on the basis of microscopic observation. FIG. 2a is an overall view of the PS petri dish while FIG. 2b illustrates an enlarged region A of FIG. 2a. On the ion irradiated faces 2 in 4 circles, cells 3 adhered to nearly the entire surfaces, but on the non-irradiated face 1, the adhering cell number is less, which clearly indicates that the cell adhesion is improved by ion implantation. Under more detailed observation, the cells 3 are localized on the circumference of the ion irradiated faces 2, which indicates that the cells having adhered onto the ion irradiated faces 2 promote the adhesion of other cells 3. The cells 3 having adhered onto the non-irradiated face 1 are approximately in circular forms, while the cells having adhered onto the ion irradiated faces 2 elongate pseudopods, which indicates excellent adhesion state.

Additionally, ion implantation was conducted individually via He$^+$, Ne$^+$, O$_2^+$ and Kr$^+$ in a fluence range of $1 \times 10^{15}$ to $3 \times 10^{17}$ ions/cm$^2$, for the same cell culture as described above. Almost the same results were obtained.

Figure 3:
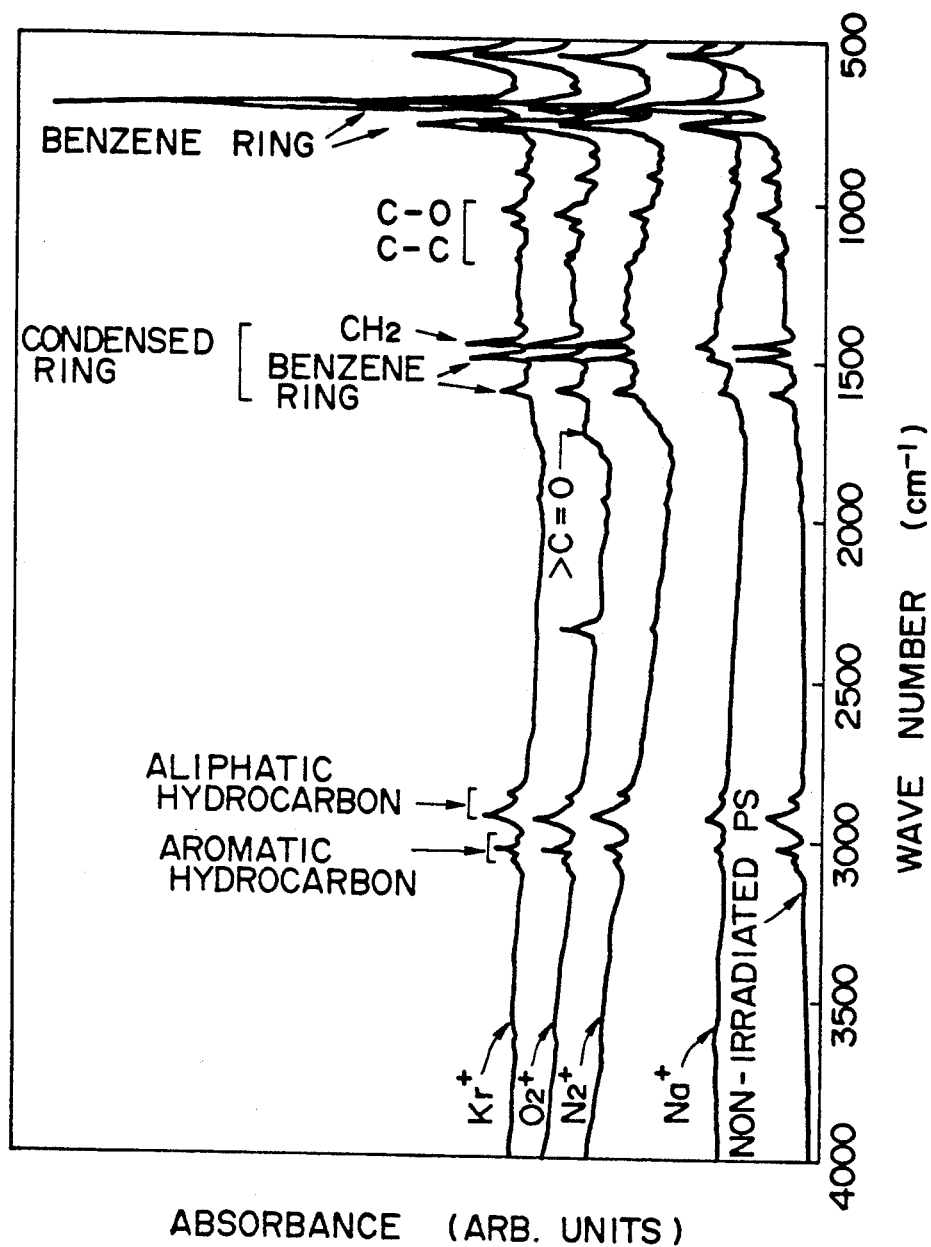
FIG. 3 is infrared absorption spectra of the PS petri dishes implanted with individual ions.

FT-IR-ATR analysis was done for the ion irradiated face of the PS petri dishes after the ion implantation of each ion of Na$^+$, $N_2^+$, $O_2^+$, and Kr$^+$ at a fluence of $1 \times 10^{17}$ ions/cm$^2$. The results are shown in FIG. 3. For comparison, the specimens without ion implantation were measured, and the results are also shown as non-irradiated PS. New structures developed by ion implantation are >C=O group (1700 cm$^{-1}$), condensed ring (1400 to 1600 cm$^{-1}$), C—C bond and C—O bond (1000 to 1200 cm$^{-1}$), OH group (3400 cm$^{-1}$) and the like. The absorption peak areas of them are normalized on the basis of the peak area of CH$_2$ (1460 cm$^{-1}$) constantly appearing in any of the specimens, so that different effects are demonstrated by the individual ion species. For example, Na$^+$ and $N_2^+$ exhibit effects on the generation of condensed rings and —OH groups, respectively.

In order to examine the decomposition ratio of aromatic rings, the absorption peak area of aromatic hydrocarbons (3000 to 3120 cm$^{-1}$) was divided by the absorption peak area of aliphatic hydrocarbons (2800 to 3000 cm$^{-1}$) to compare the value obtained. As a result, no significant correlation was observed between the ion masses and the decomposition ratios, but among the four ion species, Na$^+$ yielded the maximum effect.

Figure 4:
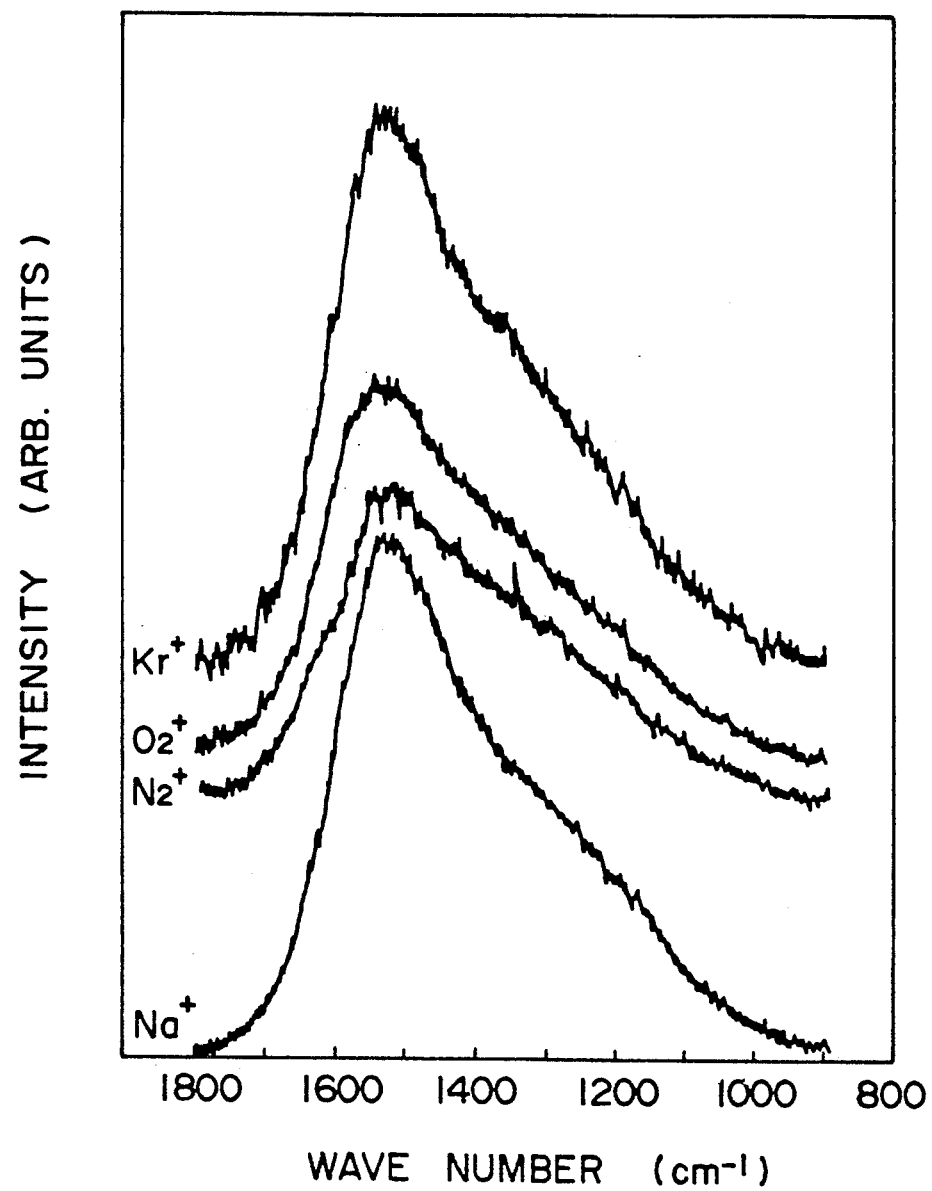
FIG. 4 is Raman scattering spectra of the PS petri dishes implanted with individual ions.

FIG. 4 further shows the Raman spectra of the specimens described above. For any of the ion species used, an asymmetric peak was observed with a shoulder on the shorter wave length side and a center around 1500 cm$^{-1}$. Among the shoulders, the one around 1330 cm$^{-1}$ corresponds to disordered graphitic sp$^2$ carbon. The one around 1480 cm$^{-1}$ corresponds to the amorphous state with sp$^1$, sp$^2$ and sp$^3$ carbons being mixed together.

EXPERIMENTAL EXAMPLE 3

In the present example. N$^+$ at a fluence of $1 \times 10^{15}$ ions/cm$^2$ was ion implanted, through an aluminium mask in a mesh form with a great number of openings of a 0.01 mm diameter disk pattern, into the bottom of a PS petri dish. Cells were cultured on the petri dish.

Figure 5:
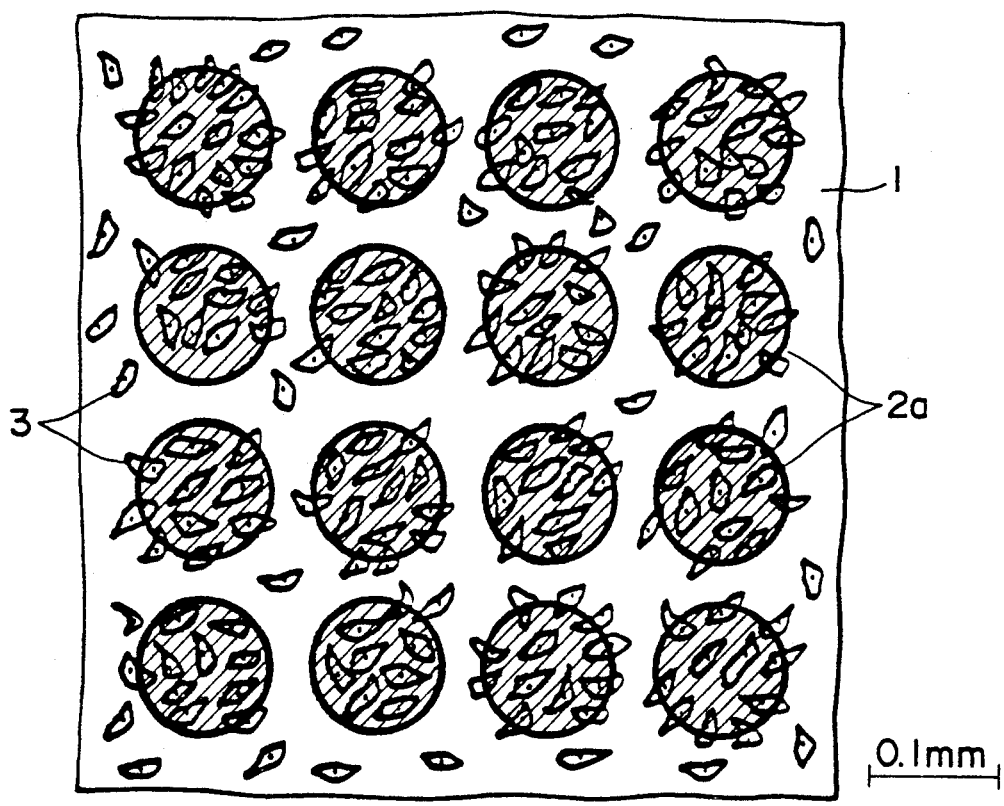
FIG. 5 is a schematic plane view depicting the cell adhesion state on the PS petri dish after $N_2^+$ irradiation on the mesh-like patterns, on the basis of microscopic observation.

FIG. 5 illustrates a sketched view of the state 2 days later on the basis of microscopic observation. In the figure. the parts common to those in FIG. 2 are represented by the same symbols. In the present experiment, cells 3 adhered more intensely to the circular ion irradiated faces 2a than to the non-irradiated face 1 on the circumference thereof.

EXPERIMENTAL EXAMPLE 4

In the present example, Na$^+$ at a fluence of $3 \times 10^{17}$ ions/cm$^2$ was ion implanted, through an aluminium mask with four openings of a 7-mm diameter disk pattern, into the SPU film-laminated bottom of a glass petri dish (referred to as SPU petri dish hereinafter). Cells were cultured on the SPU petri dish.

Figure 6A:
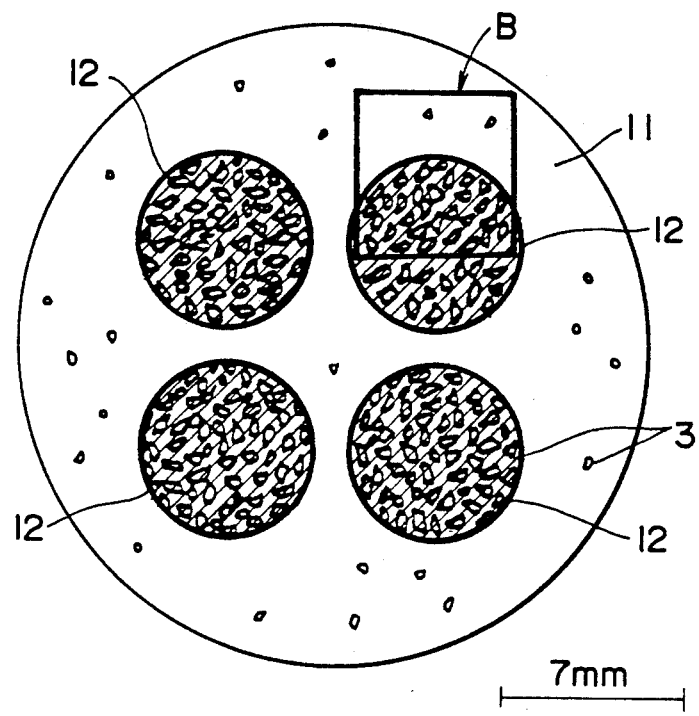
FIG. 6 is a schematic plane view depicting the cell adhesion state on the SPU petri dish after $Na^+$ irradiation on the disk patterns, on the basis of microscopic observation; (a) represents an overall plane view of the SPU petri dish while (b) represents an enlarged view of the part thereof.
Figure 6B:
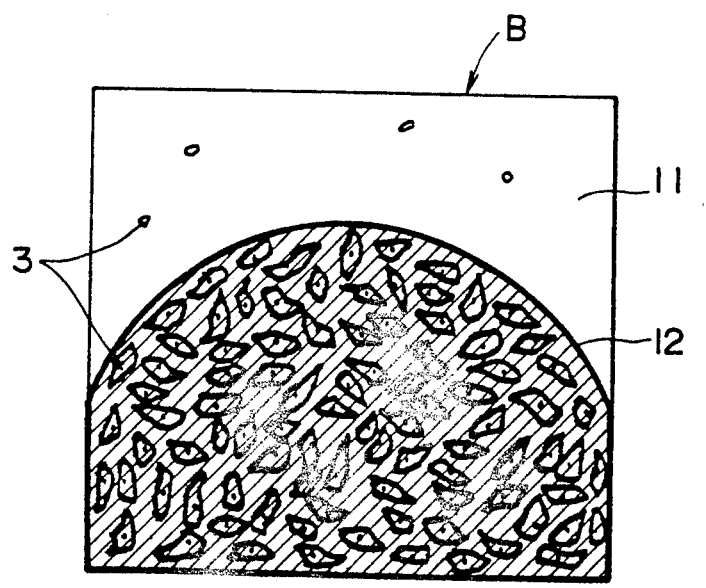

FIG. 6 illustrates a sketched view of the state 2 days later on the basis of microscopic observation. FIG. 6a is an overall view of the SPU petri dish while FIG. 6b illustrates an enlarged region B of FIG. 6a. Originally, SPU is a material with a low cell adhesion. Almost none of cells 3 adhered to the ion non-irradiated face 11. However, cells 3 adhered to nearly the entire surface of the 4 circular ion irradiated faces 12 on day 2 after the initiation of the culture.

Additionally, ion implantation was conducted individually via $He^+$, $Ne^+$, $O_2^+$ and $Kr^+$ in a fluence range of $1\times10^{15}$ to $3\times10^{17}$ ions/cm$^2$, for the same cell culture as described above. Almost the same results were obtained.

Figure 7:
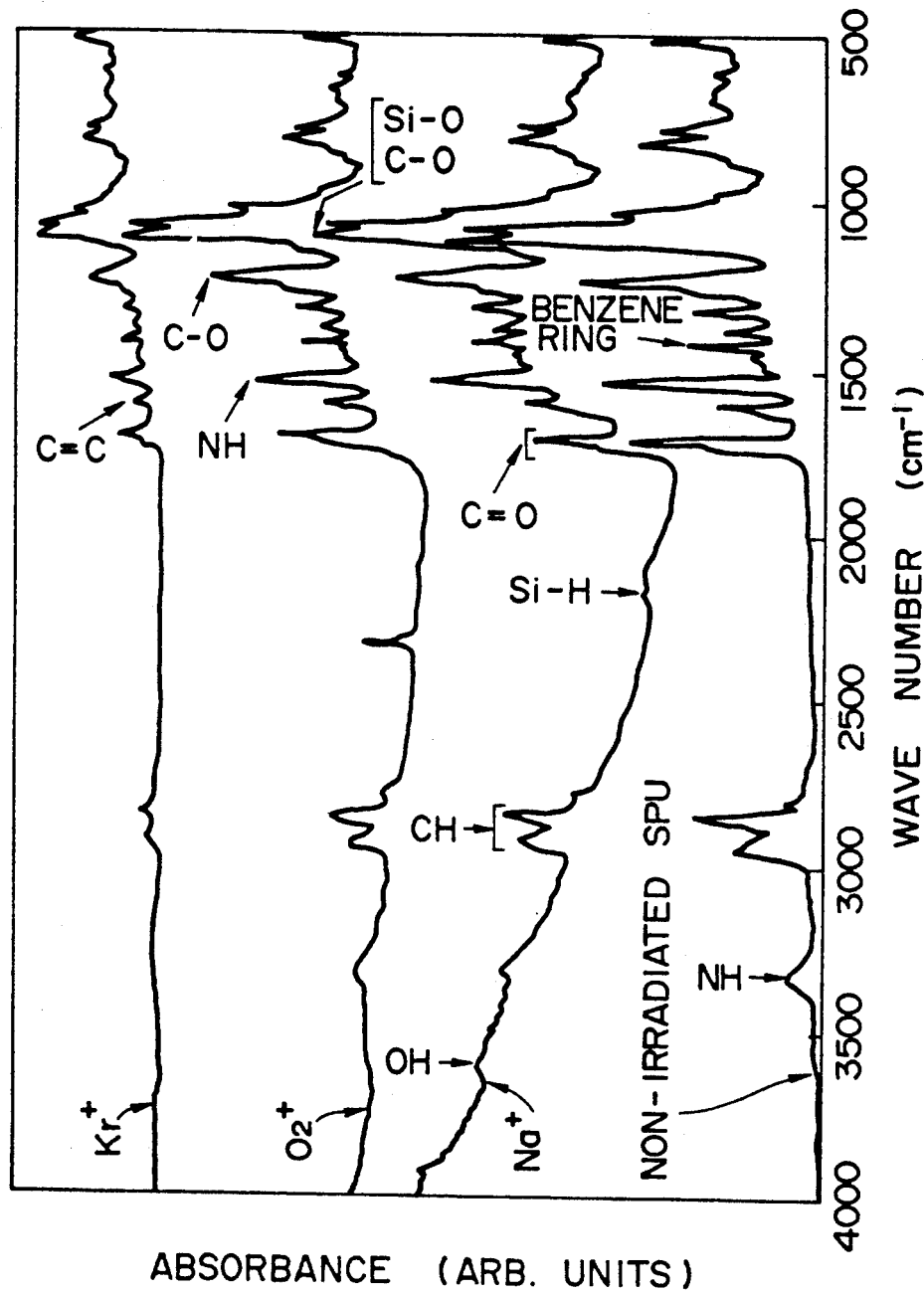
FIG. 7 is infrared absorption spectra of the SPU petri dishes implanted with individual ions.

FT-IR-ATR analysis was done for the ion irradiated face of the PS petri dishes after the ion implantation of each ion of $Na^+$, $O_2^+$, and $Kr^+$ at a fluence of $1\times10^{17}$ ions/cm$^2$. The results are shown in FIG. 7. For comparison, the specimens without ion implantation were measured, and the results are also shown as non-irradiated SPU. New structures developed by ion implantation are —OH group (3400 cm$^{-1}$), >C=O group (1700 cm$^{-1}$), amorphous carbon (1600 cm$^{-1}$), C—C bond and C—O bond (1000 to 1200 cm$^{-1}$), Si—H bond (2120 cm$^{-1}$) and the like. The absorption peak areas of them are normalized on the basis of the peak area of Si—O bond (1110 cm$^{-1}$), so that it is indicated that $Na^+$ has a remarkable effect on the generation of amorphous carbon.

In order to examine the decomposition ratios of C=O bond (1700 cm$^{-1}$), C=C bond (1600 cm$^{-1}$), and N—H bond (1535 cm$^{-1}$), these absorption peak areas were normalized on the basis of the peak area of Si—O bond (1110 cm$^{-1}$). Among the three ion species, $Kr^+$ yielded the maximum effect.

Figure 8:
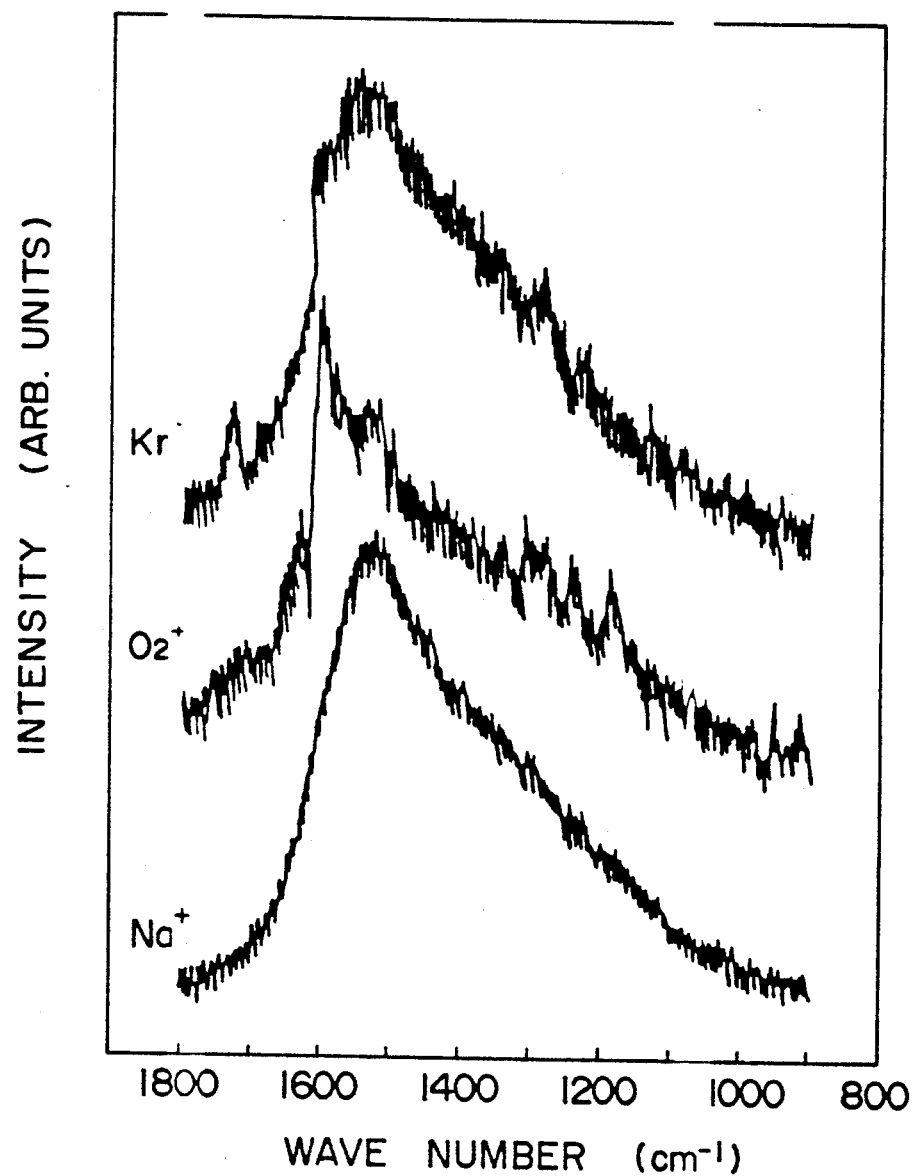
FIG. 8 is Raman scattering spectra of the SPU petri dishes implanted with individual ions.

FIG. 8 further shows the Raman spectra of the specimens described above. The results are the same as the PS petri dish results shown in FIG. 4 above, which indicates that PS and SPU produce almost the same carbon structure via ion implantation.

EXPERIMENTAL EXAMPLE 5

In the present example, $Na^+$ at a fluence of $1\times10^{15}$ ions/cm$^2$ was ion implanted, through an aluminium mask in a mesh form with a great number of openings of a 0.01-mm diameter disk pattern, into the bottom of an SPU petri dish. Cells were cultured on the petri dish.

Figure 9:
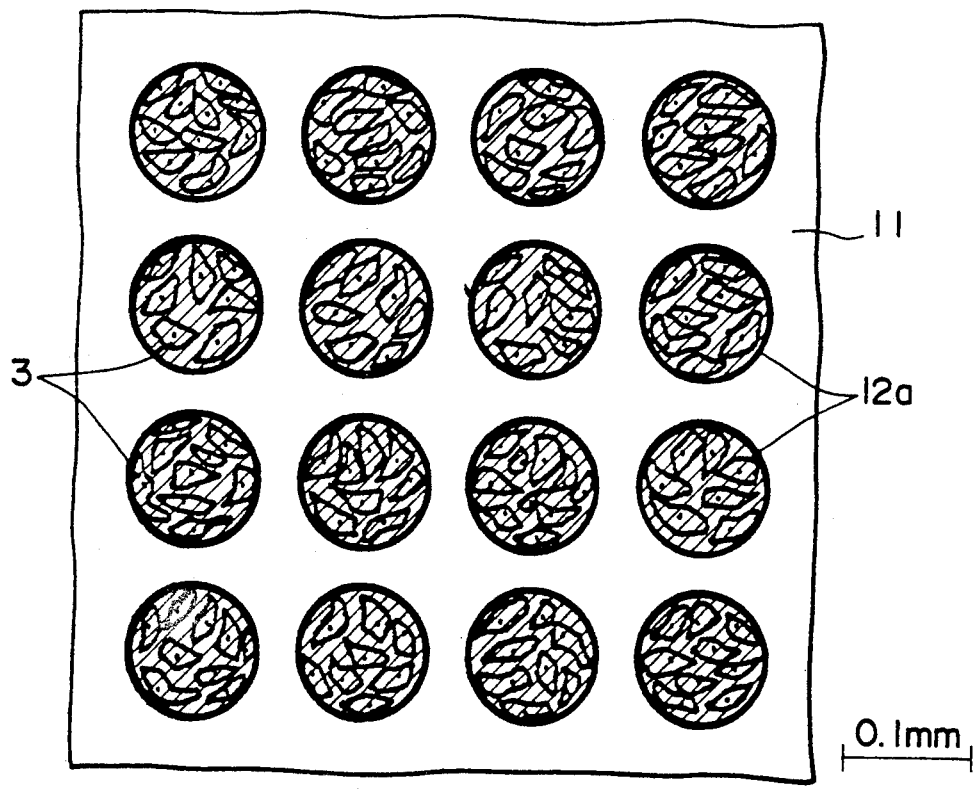
FIG. 9 is a schematic plane view depicting the cell adhesion state on the SPU petri dish after $Na^+$ irradiation on the mesh-like patterns, on the basis of microscopic observation.

FIG. 9 illustrates a sketched view of a part of the state 7 days later on the basis of microscopic observation. In the figure, the parts common to those in FIG. 6 are represented by the same symbols. In the present experiment, cells 3 also adhered to almost the entire surface of the ion irradiated faces 12a, although no adhesion of cells 3 was observed on the non-irradiated face 11, which indicates that selective ion implantation can control cell adhesion two-dimensionally if SPU is employed.

As apparently shown in the description insofar, the cell adhesive material according to the first aspect of the present invention has more improved cell adhesion than the conventional materials, or has such adhesion newly provided. As the improvement or provision of cell adhesion directly reflects the change in chemical structure of the polymer material surface, no process for coating an adhesive protein such as collagen is required. As an application directly incorporating the fruitful results from the experimental examples described above, petri dishes for cell culture are premising. From the standpoint of providing a fundamental basis for developing further a variety of medicinal materials including hybrid-type artificial vessel via the adhesion of vascular endothelial cells and artificial skin via the adhesion of dermal cells, the present invention is of an industrially significant value.

According to the method for preparing a cell adhesive material of the second aspect of the present invention, the above-mentioned surface modification is effected through ion implantation with excellent controllability and reproducibility. This invention is also extremely industrially as a practical means for supplying the cell adhesive material.

We claim:

1. A cell adhesive material comprising a polymer material containing carbon as a constituting element, the polymer having a surface which has been modified by ions implanted into the polymer surface by ion bombardment thereby causing cells to adhere to the modified surface.

2. The cell adhesive material according to claim 1, wherein the polymer material is polystyrene or segmented polyurethane.

3. The cell adhesive material according to claim 2, wherein the segmented polyurethane is composed of a soft segment comprising polytetramethylene oxide and a dimethyl polysiloxane compound and a hard segment comprising diphenylmethane-4,4-diisocyanate and ethylene glycol.

4. The cell adhesive material according to claim 1, wherein the surface modifying layer contains at least one of >C=O group, a condensed ring, C—C bond, C—O bond, —OH group, and Si—H bond.

5. A method for producing a cell adhesive material, comprising implanting ions in a range of $1\times10^{15}\leq\phi<1\times10^{18}$ ions/cm$^2$ into at least a part of the surface of a polymer material containing carbon as a constituting element.

6. The method for producing a cell adhesive material according to claim 5, wherein the polymer material is polystyrene or segmented polyurethane.

7. The method for producing a cell adhesive material according to claim 6, wherein the segmented polyurethane is composed of a soft segment comprising polytetramethylene oxide and a dimethyl polysiloxane compound and a hard segment comprising diphenylmethane-4,4-diisocyanate and ethylene glycol.

8. The method for producing a cell adhesive material according to claim 5, wherein the ion species to be introduced is at least one of $He^+$, $N^+$, $Ne^+$, $Na^+$, $N_2^+$, $O_2^+$, and $Kr^+$.

9. The method for producing a cell adhesive material according to claim 5, wherein the ion accelerating energy is 50 to 500 keV.

10. The method for producing a cell adhesive material according to claim 5, wherein the beam current density of the implanted ions is 0.5 $\mu$A/cm$^2$ or less.

* * * * *